United States Patent
Tsubokawa (10) Patent No.: US 8,366,152 B2
(45) Date of Patent: Feb. 5, 2013

(54) VEHICLE EQUIPPED WITH HIGH-PRESSURE TANK AND TANK ASSEMBLY

(75) Inventor: Takehisa Tsubokawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 208 days.

(21) Appl. No.: 12/739,321

(22) PCT Filed: Oct. 16, 2008

(86) PCT No.: PCT/JP2008/069172
§ 371 (c)(1),
(2), (4) Date: Apr. 22, 2010

(87) PCT Pub. No.: WO2009/054427
PCT Pub. Date: Apr. 30, 2009

(65) Prior Publication Data
US 2010/0252353 A1    Oct. 7, 2010

(30) Foreign Application Priority Data
Oct. 23, 2007 (JP) ................................. 2007-275611

(51) Int. Cl.
*A47K 1/08* (2006.01)
(52) U.S. Cl. .......................... 280/834; 280/830; 280/784
(58) Field of Classification Search .................. 280/834, 280/830, 784
See application file for complete search history.

(56) References Cited

U.S. PATENT DOCUMENTS

| | | | | |
|---|---|---|---|---|
| 4,093,254 A * | 6/1978 | Ezaki | ............... | 280/783 |
| 5,114,184 A * | 5/1992 | Shimomura et al. | .......... | 280/784 |
| 5,518,272 A * | 5/1996 | Fukagawa et al. | ............ | 280/834 |
| 5,794,979 A * | 8/1998 | Kasuga et al. | ................ | 280/834 |
| 5,810,309 A * | 9/1998 | Augustine et al. | ............ | 248/313 |
| 5,992,885 A * | 11/1999 | Fukagawa et al. | ............ | 280/830 |
| 5,997,040 A * | 12/1999 | Fukagawa et al. | ............ | 280/834 |
| 6,042,071 A * | 3/2000 | Watanabe et al. | ............ | 248/313 |
| 6,086,103 A * | 7/2000 | Fukagawa et al. | ............ | 280/830 |
| 6,637,706 B2 * | 10/2003 | Kim et al. | ...................... | 248/154 |
| 6,672,620 B2 * | 1/2004 | Kawazu et al. | ............... | 280/834 |
| 6,824,168 B2 * | 11/2004 | Kawazu et al. | ............... | 280/834 |
| 6,953,099 B2 * | 10/2005 | Kawasaki et al. | ............ | 180/65.1 |
| 6,983,945 B2 * | 1/2006 | Kawasaki et al. | ............ | 280/834 |

(Continued)

FOREIGN PATENT DOCUMENTS

| JP | 8-25978 A | 1/1996 |
|---|---|---|
| JP | 2002-370550 A | 12/2002 |

(Continued)

*Primary Examiner* — Kevin Hurley
*Assistant Examiner* — Michael Stabley
(74) *Attorney, Agent, or Firm* — Kenyon & Kenyon LLP (57) ABSTRACT

A tank mounting structure adopts a new approach against a force of moving downward a high-pressure tank transversely mounted on a vehicle. A tank mounting assembly has a winding strap and a restraining strap located on an upper side and a lower side of a high-pressure tank to transversely fix the high-pressure tank between a frame and a frame. This structure causes the high-pressure tank to be transversely mounted on the vehicle. A winding strap is wound on the high-pressure tank. A restraining strap extended from a fixing bracket of the winding strap is laid on the winding strap to be placed directly on an upper end portion of a circumferential wall of the high-pressure tank and is fastened to the frame.

8 Claims, 8 Drawing Sheets

U.S. PATENT DOCUMENTS

| | | | |
|---|---|---|---|
| 7,063,355 B2 * | 6/2006 | Hashimura | 280/830 |
| 7,198,301 B2 * | 4/2007 | Wozniak et al. | 280/830 |
| 7,264,277 B2 * | 9/2007 | Ono et al. | 280/830 |
| 7,819,431 B2 * | 10/2010 | Minami | 280/834 |
| 2003/0042057 A1 * | 3/2003 | Kawazu et al. | 180/69.4 |
| 2003/0047932 A1 * | 3/2003 | Kawazu et al. | 280/830 |
| 2004/0239095 A1 * | 12/2004 | Wozniak et al. | 280/834 |
| 2005/0161935 A1 * | 7/2005 | Ono et al. | 280/834 |

FOREIGN PATENT DOCUMENTS

JP  2005-075224 A  3/2005

* cited by examiner

VEHICLE EQUIPPED WITH HIGH-PRESSURE TANK AND TANK ASSEMBLY

This is a 371 national phase application of PCT/JP2008/069172 filed 16 Oct. 2008, which claims priority of Japanese Patent Application No. 2007-275611 filed 23 Oct. 2007, the contents of which are incorporated herein by reference.

TECHNICAL FIELD

The present invention relates to a vehicle equipped with a high-pressure tank transversely mounted under the vehicle floor, as well as to a tank assembly constructed to enable a high-pressure tank to be transversely mounted under the vehicle floor.

BACKGROUND ART

A vehicle using fuel cells as a driving power source is generally equipped with high-pressure tanks designed to store therein a high-pressure hydrogen gas or a high-pressure hydrogen-containing gas as the fuel. One typical method of mounting the high-pressure tanks on the vehicle places the high-pressure tanks under the vehicle floor with a view to assuring sufficient spaces both for the vehicle interior and for the trunk (see, for example, JP-A 2002-370550)

This cited patent document discloses a technique of preventing a drop-out of any of the high-pressure tanks under the application of a force in a direction of moving the high-pressure tank upward. In the actual state, however, diverse forces in various directions are applied on the high-pressure tanks transversely mounted on the vehicle. A force may be applied in a direction of moving the high-pressure tank downward. In such cases, a significantly large loading may be applied onto a high-pressure piping arranged to pass through the respective high-pressure tanks.

DISCLOSURE OF THE INVENTION

By taking into account the problem of the prior art discussed above, there would be a requirement for proposing a new approach against a force of moving downward a high-pressure tank transversely mounted on a vehicle.

The present invention accomplishes at least part of the requirement mentioned above and the other relevant requirements by any of various aspects and applications discussed below.

One aspect of the invention is directed to a vehicle equipped with a high-pressure tank transversely mounted under a vehicle floor to have a tank longitudinal direction extended along the vehicle floor. A winding strap is wound on the transversely mounted high-pressure tank. A restraining strap fixed to the winding strap is protruded from a position of the fixation to the winding strap and is fastened to a body of the vehicle.

The vehicle according to this aspect of the invention uses the winding strap and the restraining strap to fix the transversely mounted high-pressure tank. The restraining strap has one end fixed to the winding strap and the other end fastened to the body of the vehicle. The transversely mounted high-pressure tank is accordingly attached to the vehicle by means of the restraining strap fastened to the body of the vehicle and the winding strap wound on the high-pressure tank. Even under the application of a force in a direction of moving the transversely mounted high-pressure tank downward, the winding strap effectively restricts the downward movement of the high-pressure tank. This arrangement desirably relieves the potential loading on a high-pressure piping arranged to pass through the respective tanks due to the potential downward movement of the transversely mounted high-pressure tank by an amount corresponding to the restriction of the tank movement by means of the winding strap. In the structure of transversely mounting the high-pressure tank under the vehicle floor to have the tank longitudinal direction extended along the vehicle floor, the high-pressure tank may be arranged in parallel with the vehicle floor or may be arranged to have some inclination to the vehicle floor.

In one preferable embodiment of the vehicle according to the above aspect of the invention, the restraining strap is protruded from the position of the fixation to the winding strap and is extended along an upper end portion of a circumferential wall of the high-pressure tank to be fastened to the body of the vehicle. Under the application of a force in the direction of moving the transversely mounted high-pressure tank downward, the high-pressure tank moves downward away from the restraining strap, which is laid on the upper end portion of the circumferential wall of the high-pressure tank. Since the restraining strap is placed directly on the upper end portion of the circumferential wall of the high-pressure tank, the applied force in the direction of moving the high-pressure tank downward away from the restraining strap simply moves the high-pressure tank downward but does not include a rotational force of turning the high-pressure tank. Namely the high-pressure tank does not rotate about its own tank shaft and does not apply a tank rotation-induced loading onto the high-pressure piping. In the vehicle of the above embodiment, one typical structure of making the restraining strap extended from the position of the fixation along the upper end portion of the circumferential wall of the high-pressure tank lays the restraining strap on the winding strap. Another structure may cause the restraining strap to be extended along the upper end portion of the circumferential wall of the high-pressure tank without being laid on the winding strap.

In one preferable application of the vehicle according to the above embodiment of the invention, the restraining strap is fastened to the body of the vehicle at a preset tank face position that is opposite to the position of the fixation of the restraining strap to the winding strap on the circumferential wall of the high-pressure tank. This arrangement enables the restraining strap to be accurately and readily extended along the upper end portion of the circumferential wall of the high-pressure tank.

The principle of the present invention is not restricted to the vehicle equipped with the high-pressure tank but is also actualized by a tank assembly designed to mount a high-pressure tank to a vehicle.

Another aspect of the invention is accordingly directed to a tank assembly constructed to mount a high-pressure tank to a vehicle. The tank assembly has a pair of frames located on both sides of the high-pressure tank to be extended in a tank longitudinal direction and arranged along a vehicle width direction under a vehicle floor to be fastened to a body of the vehicle. The tank assembly also has a tank restraint belt spanned between the pair of frames located on both the sides of the high-pressure tank to transversely arrange the high-pressure tank and fix the high-pressure tank between the pair of frames. The tank assembly includes a winding strap wound on the high-pressure tank transversely arranged and fixed between the pair of frames, and a restraining strap fixed to the winding strap at a preset position on one frame of the pair of frames. The restraining strap is protruded from the preset position of the fixation and is extended along an upper end portion of a circumferential wall of the high-pressure tank to be fastened to the other frame of the pair of frames.

The tank assembly takes an effective approach in advance as the sub-assembly structure against a potential downward movement of the transversely arranged high-pressure tank and allows the high-pressure tank to be transversely mounted on the vehicle.

BEST MODES OF CARRYING OUT THE INVENTION

Figure 1:
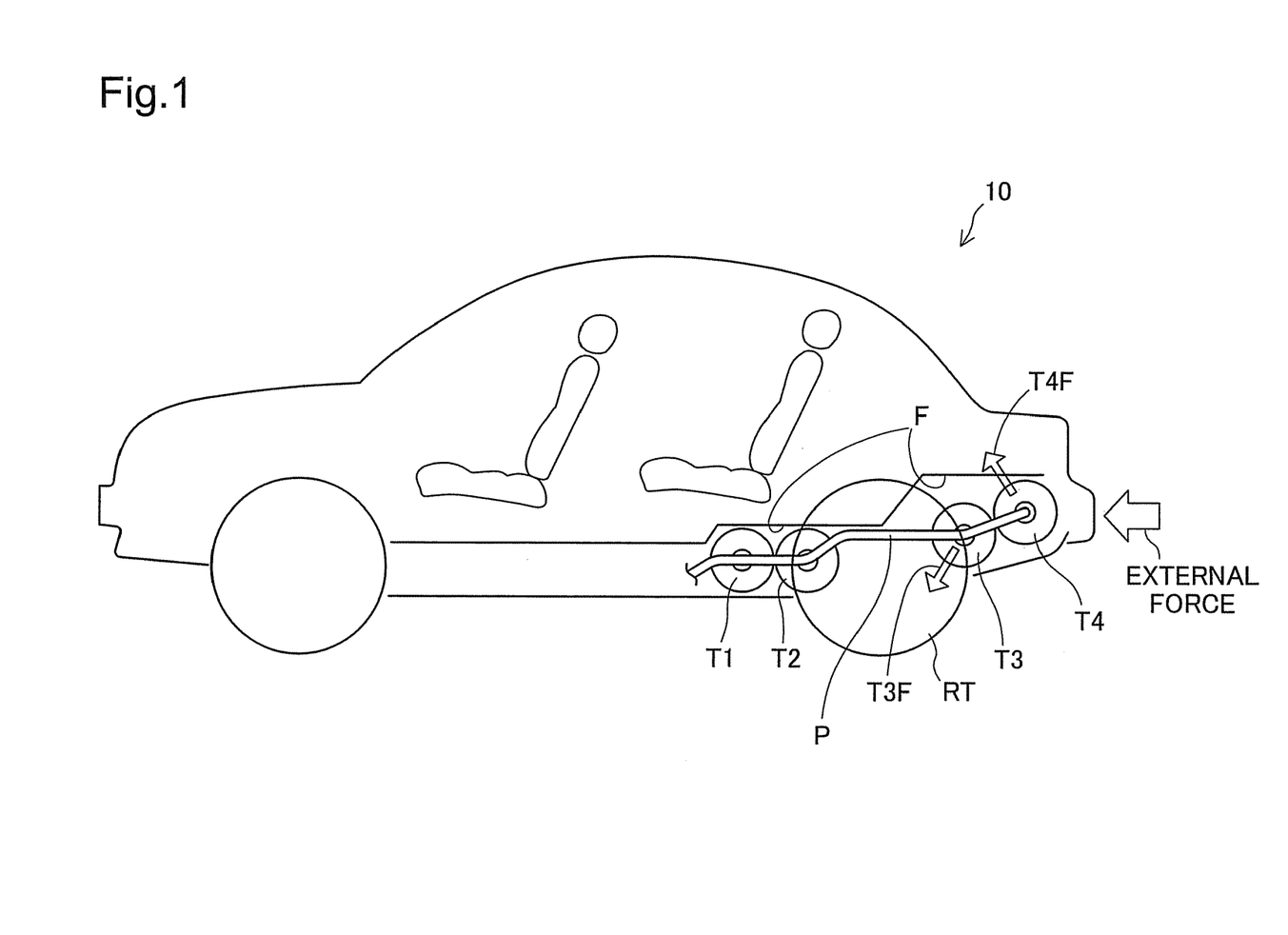
FIG. 1 is an explanatory view schematically illustrating one tank mounting state in a vehicle 10 in one embodiment according to the invention.
Figure 2:
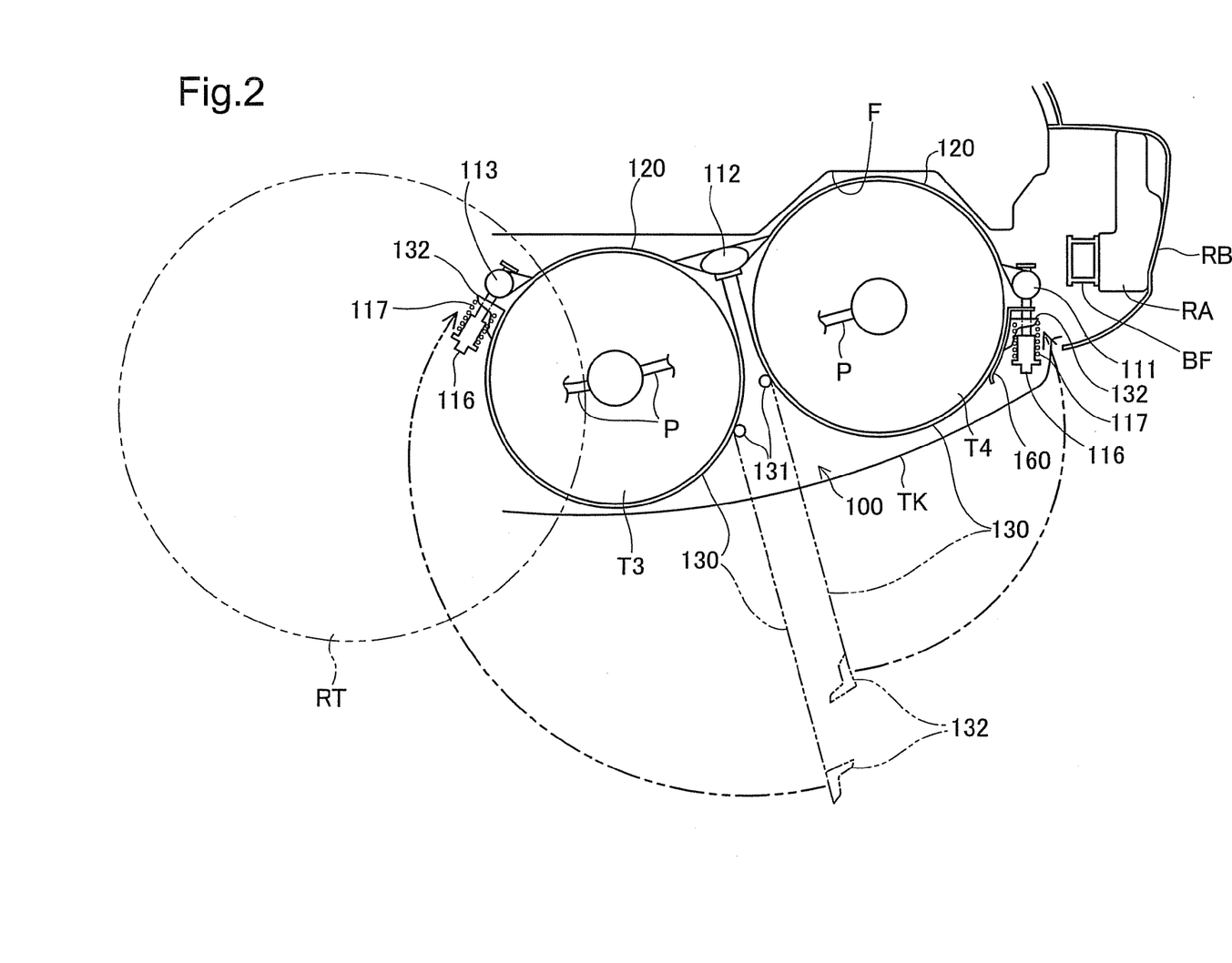
FIG. 2 is an explanatory view showing a tank mounting assembly 100 provided in a rear body portion of the vehicle 10, seen from a lateral side of the vehicle.
Figure 3:
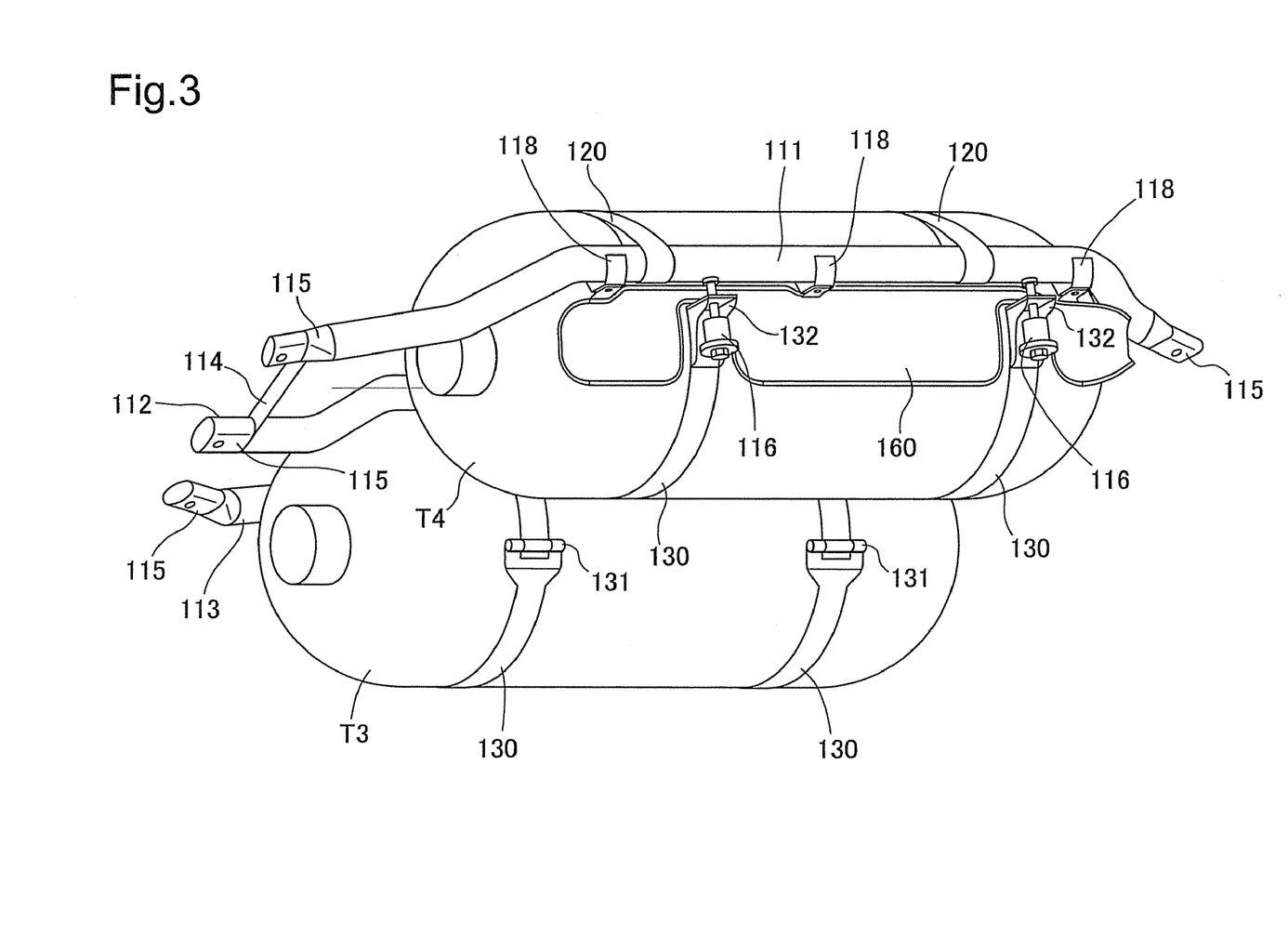
FIG. 3 is a perspective explanatory view showing the tank mounting assembly 100, seen from a rear side of the vehicle.
Figure 4:
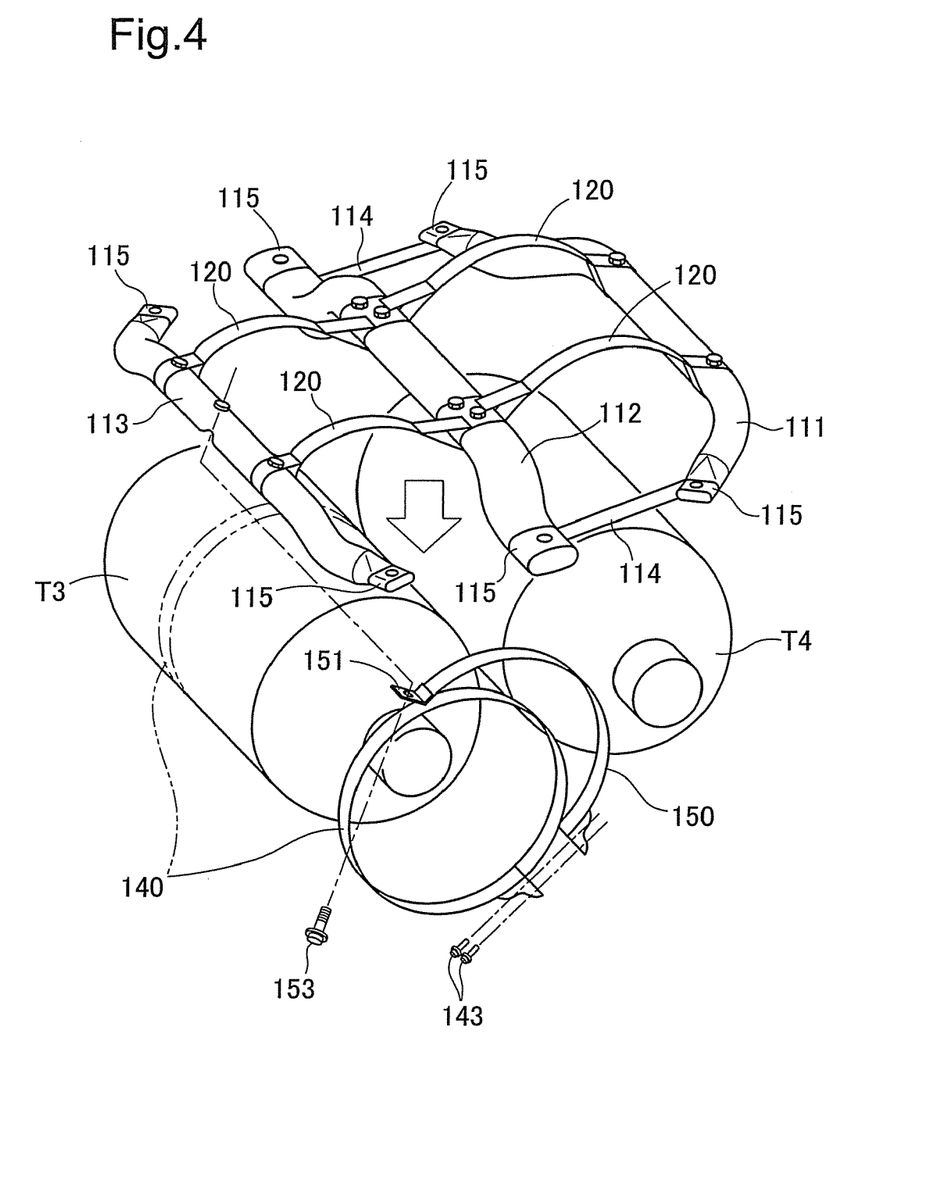
FIG. 4 is an explanatory view showing a state of mounting tanks in the tank mounting assembly 100.

One mode of carrying out the invention is described below as an embodiment. FIG. 1 is an explanatory view schematically illustrating one tank mounting state in a vehicle 10 in one embodiment according to the invention. FIG. 2 is an explanatory view showing a tank mounting assembly 100 provided in a rear body portion of the vehicle 10, seen from a lateral side of the vehicle. FIG. 3 is a perspective explanatory view showing the tank mounting assembly 100, seen from a rear side of the vehicle. FIG. 4 is an explanatory view showing a state of mounting tanks in the tank mounting assembly 100.

Referring to FIG. 1, the vehicle 10 has four high-pressure tanks T1 through T4 transversely mounted under a platform F to adjust the direction of tank lengths to the direction of a vehicle width. Each of these high-pressure tanks T1 through T4 is designed to store therein a high-pressure hydrogen gas having a pressure of 70 MPa at the highest. The hydrogen gas stored in each of the high-pressure tanks T1 through T4 flows through a gas piping P and is supplied to fuel cells (not shown) mounted on the vehicle 10. The hydrogen gas is subjected to pressure reduction with a pressure reducing valve and is supplied to the fuel cells.

The high-pressure tanks T1 and T2 are fastened to a tank framing structure (discussed later) to be unitized. The high-pressure tanks T1 and T2 are transversely mounted side by side at substantially identical heights on a front side of an axle of rear wheels RT. The high-pressure tanks T3 and T4 are also fastened to a tank framing structure to be unitized. The high-pressure tanks T3 and T4 are transversely mounted on a rear side of the axle of the rear wheels RT. On the rear side of the vehicle body, the high-pressure tank T4 is located at a higher position than that of the high-pressure tank T3. The obliquely side-by-side arrangement of the high-pressure tank T3 at the lower position and the high-pressure tank T4 at the higher position enables the two tanks T3 and T4 to be mounted in a space-saving manner in a narrow tank mounting space behind the axle of the rear wheels RT.

The high-pressure tank T3 and the high-pressure tank T4 are transversely mounted in the obliquely side-by-side arrangement. Under application of an excess external force from the rear side of the vehicle body as shown in FIG. 1, the high-pressure tank T4 on the rear side of the vehicle body tends to move obliquely upward as shown by an open arrow T4F. The high-pressure tank T3 located on the front side of and at the lower position than the high-pressure tank T4 is pressed against the high-pressure tank T4 moving obliquely upward. The high-pressure tank T3 accordingly tends to move obliquely downward as shown by an open arrow T3F. In the configuration of this embodiment, a winding strap 140 and a restraining strap 150 (discussed later) are used to interfere with the obliquely downward movement of the high-pressure tank T3.

The tank unitization is described in detail with reference to the high-pressure tanks T3 and T4 as an example. As shown in FIGS. 2 through 4, the tank mounting assembly 100 includes three frames 111 through 113 arranged side by side in a tank longitudinal direction. The frame 111 on the side of the high-pressure tank T4 and the middle frame 112 are joined together at their respective both ends by means of reinforcement frames 114. Each frame has plate-like fixing seats 115 provided on both ends and used to fix the tank mounting assembly 100 to a vehicle framework with bolts (not shown). For the purpose of weight reduction, each frame is formed by pressing and bending a metal pipe. Reinforcing metal blocks are provided in specific sites requiring the higher strength, for example, inside the fixing seats 115.

In the tank mounting assembly 100, the high-pressure tank T4 is transversely mounted between the frame 111 and the frame 112 to adjust the tank longitudinal direction to the lengths of the frames 111 and 112. In a similar manner, the high-pressure tank T3 is transversely mounted between the frame 112 and the frame 113. The frame 111 on the side of the transversely mounted high-pressure tank T4 is located slightly above a lateral side on a circumferential wall of the high-pressure tank T4, seen from a tank shaft of the high-pressure tank T4 extended in the tank longitudinal direction. The frame 112 and the frame 113 are located at opposed lateral positions on an upper end side of a circumferential wall of the high-pressure tank T3, seen from a tank shaft of the high-pressure tank T3. Two tank upper end restraint belts 120 and two tank lower end restraint belts 130 are spanned between each pair of adjacent frames for fixation of a corresponding tank to the adjacent frames. The tank upper end restraint belts 120 and the tank lower end restraint belts 130 are both made of a metal material. Each of the tank upper end restraint belts 120 is formed as a fixed-size belt having respective ends fastened to the adjacent frames. In a state of clamping and restraining a tank with the tank lower end restraint belts 130, the tank upper end restraint belts 120 are in close contact with the upper end side on the circumferential wall of the tank. As explained above, the frame 111 on the side of the high-pressure tank T4 is located at the lateral position on the circumferential wall, seen from the tank shaft. The frame 112 and the frame 113 on the opposed lateral sides of the high-pressure tank T3 are located close to the upper end side on the circumferential wall, seen from the tank shaft. The tank upper end restraint belts 120 provided for the high-pressure tank T4 are accordingly designed to have greater lengths than the tank upper end restraint belts 120 provided for the high-pressure tank T3 and are in close contact with the high-pressure tank T4 over a wider area at the upper end position on the circumferential wall of the high-pressure tank T4. In the description below, the circumferential wall positions, such as the lateral side, the upper end side, and the lower end side of the tank circumferential wall represent the positions seen from the tank shaft extended in the longitudinal direction of the transversely mounted high-pressure tank, as explained previously.

The tank lower end restraint belt 130 has one end fastened to the frame 112 located between the high-pressure tank T3 and the high-pressure tank T4. The tank lower end restraint belt 130 has a hinge 131 in the middle of the belt length and a fixing bracket 132 on its free end. Each fixing bracket 132 is engaged with a belt fixing element 116 provided on the frame 111 and the frame 113. The belt fixing element 116 applies a pressing force of a spring 117 onto the fixing bracket 132 and fastens the fixing bracket 132 to the frame 111 or to the frame 113. Each of the tank lower end restraint belts 130 is extended from the frame 112 toward the lower end side of the tank and is in close contact with the lower end side of the tank circumferential wall. The tank lower end restraint belts 130 accordingly lift up the respective high-pressure tanks T3 and T4 toward the tank upper end restraint belt 120s, while fastening the transversely mounted high-pressure tanks T3 and T4 to the frames 111 through 113. The tank lower end restraint belt 130 is bendable at the hinge 131. This arrangement enables the belt length of the tank lower end restraint belt 130 between the hinge 131 and the fixing bracket 132 to be securely in close contact with the lower end side of the tank circumferential wall and desirably facilitates the series of work for the intimate attachment of the tank lower end restraint belt 130. Both the tank upper end restraint belts 120 and the tank lower end restraint belts 130 have belt-like cushion members (not shown) arranged to be in direct contact with the tank circumferential wall.

Figure 5:
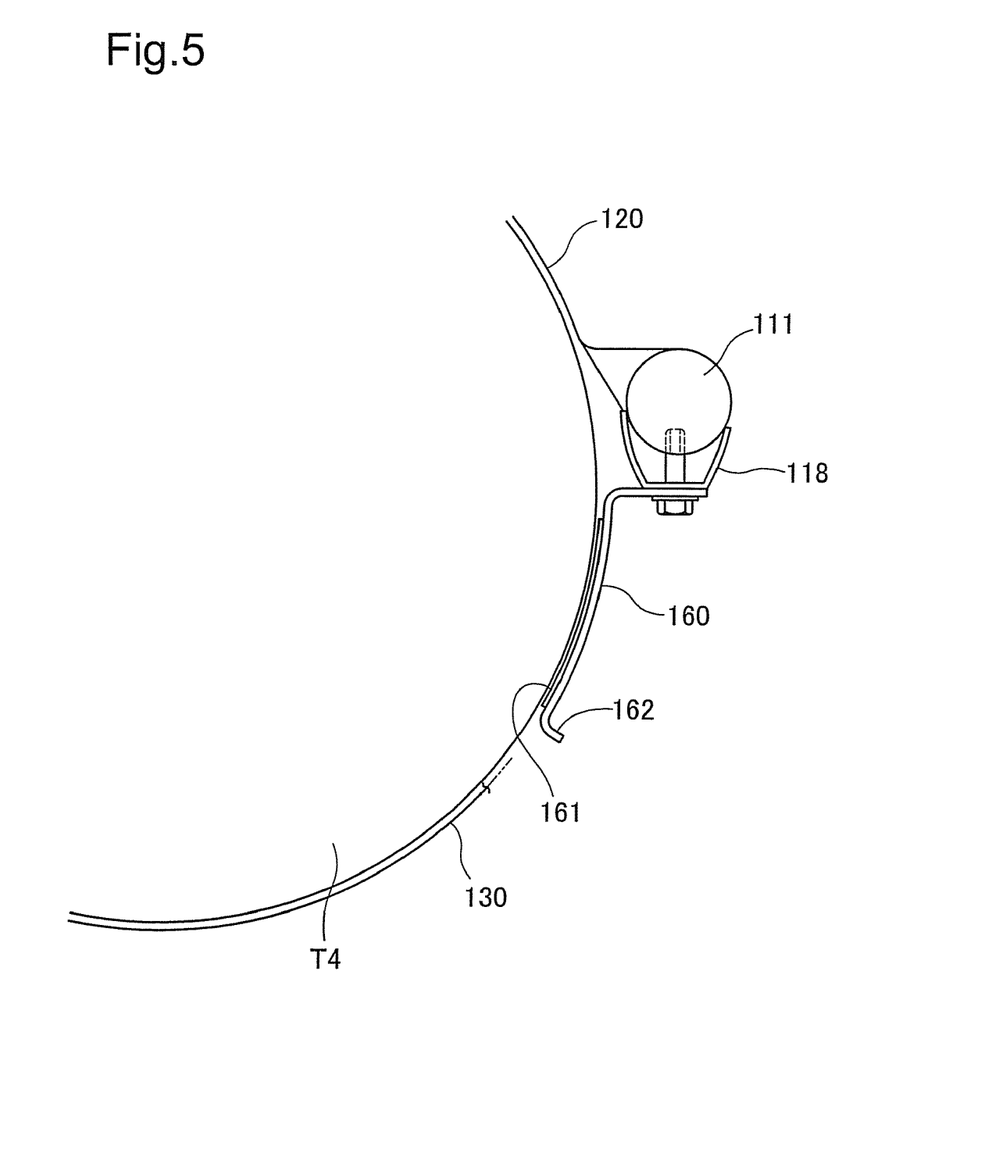
FIG. 5 is an explanatory view showing an attachment state of a protector 160.

The tank mounting assembly 100 has a protector 160 located on the frame 111 on the side of the high-pressure tank T4. The protector 160 is manufactured by pressing a steel metal plate into a required shape. The protector 160 is extended along the longitudinal direction of the high-pressure tank T4 transversely mounted between the adjacent frames 111 and 112 by means of the tank upper end restraint belts 120 and the tank lower end restraint belts 130 to cover over a preset lateral side area of the tank circumferential wall as shown in FIG. 3. FIG. 5 is an explanatory view showing an attachment state of the protector 160. The protector 160 is bolted to three fixation arms 118 provided at three different positions on the frame 111. The protector 160 is arranged to have no interference with the belt fixing elements 116 and is extended from the frame 111 located slightly above the lateral side on the circumferential wall of the high-pressure tank T4 toward the lower end side of the high-pressure tank T4 to be opposed to the lateral side of the tank circumferential wall. Namely the protector 160 covers over a partial area extended along the tank longitudinal direction from the lateral side to the lower end side on the circumferential wall of the high-pressure tank T4. The protector 160 is curved along the circumferential wall (cylindrical shape) of the high-pressure tank T4 and has a cushion member 161 arranged to be in direct contact with the tank circumferential wall. The protector 160 is thus arranged to be opposed to the tank circumferential wall via the cushion member 161 in direct contact with the tank circumferential wall as shown in FIG. 5. The protector 160 is fastened to the frame 111 to be opposed to the tank circumferential wall of the high-pressure tank T4, such that a lower bent end 162 is located above a lower-most end on the circumferential wall of the high-pressure tank T4.

Figure 6:
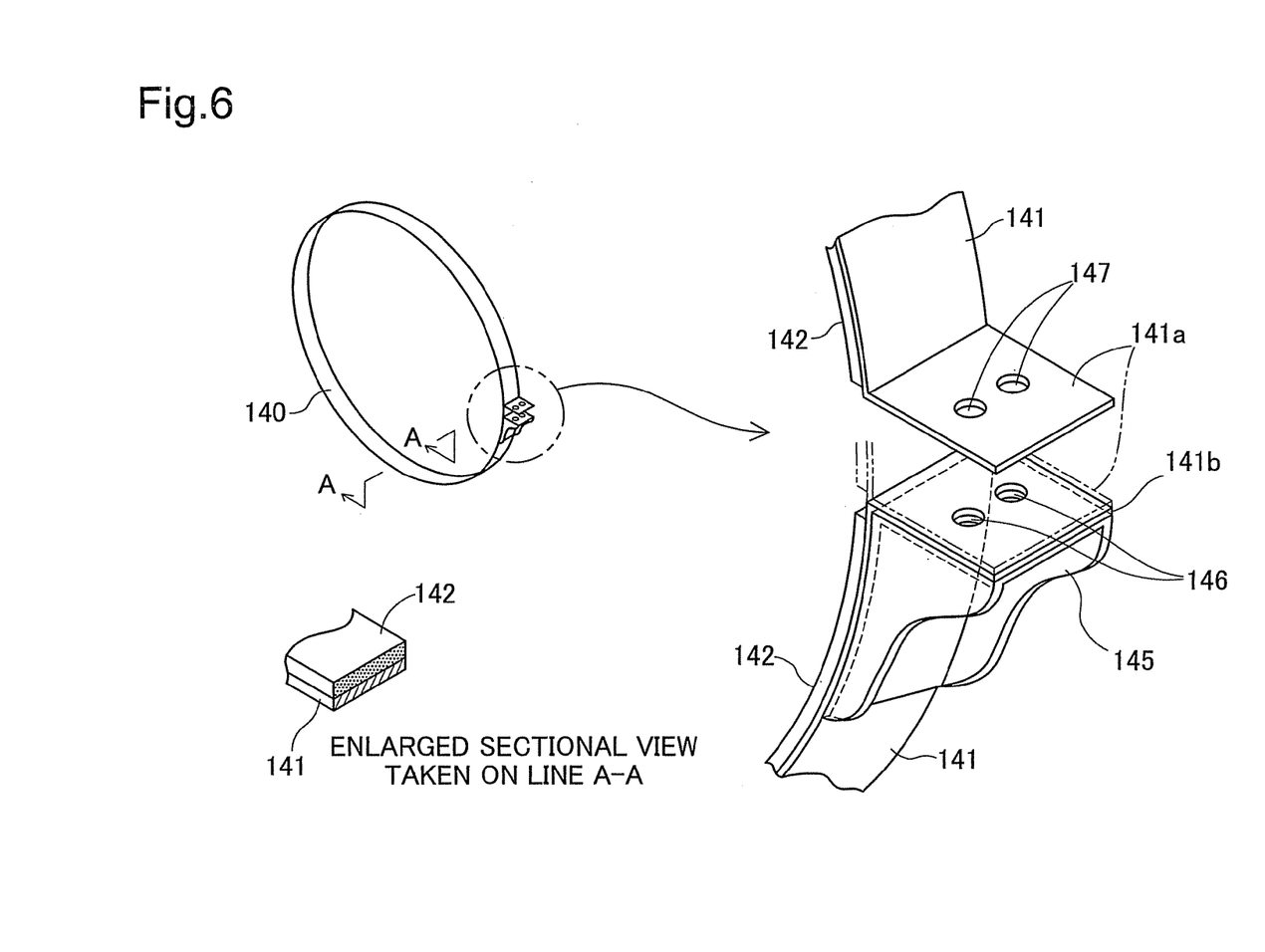
FIG. 6 is an explanatory view of a winding strap 140 including a sectional view and an enlarged view of parts of the winding strap 140.
Figure 7:
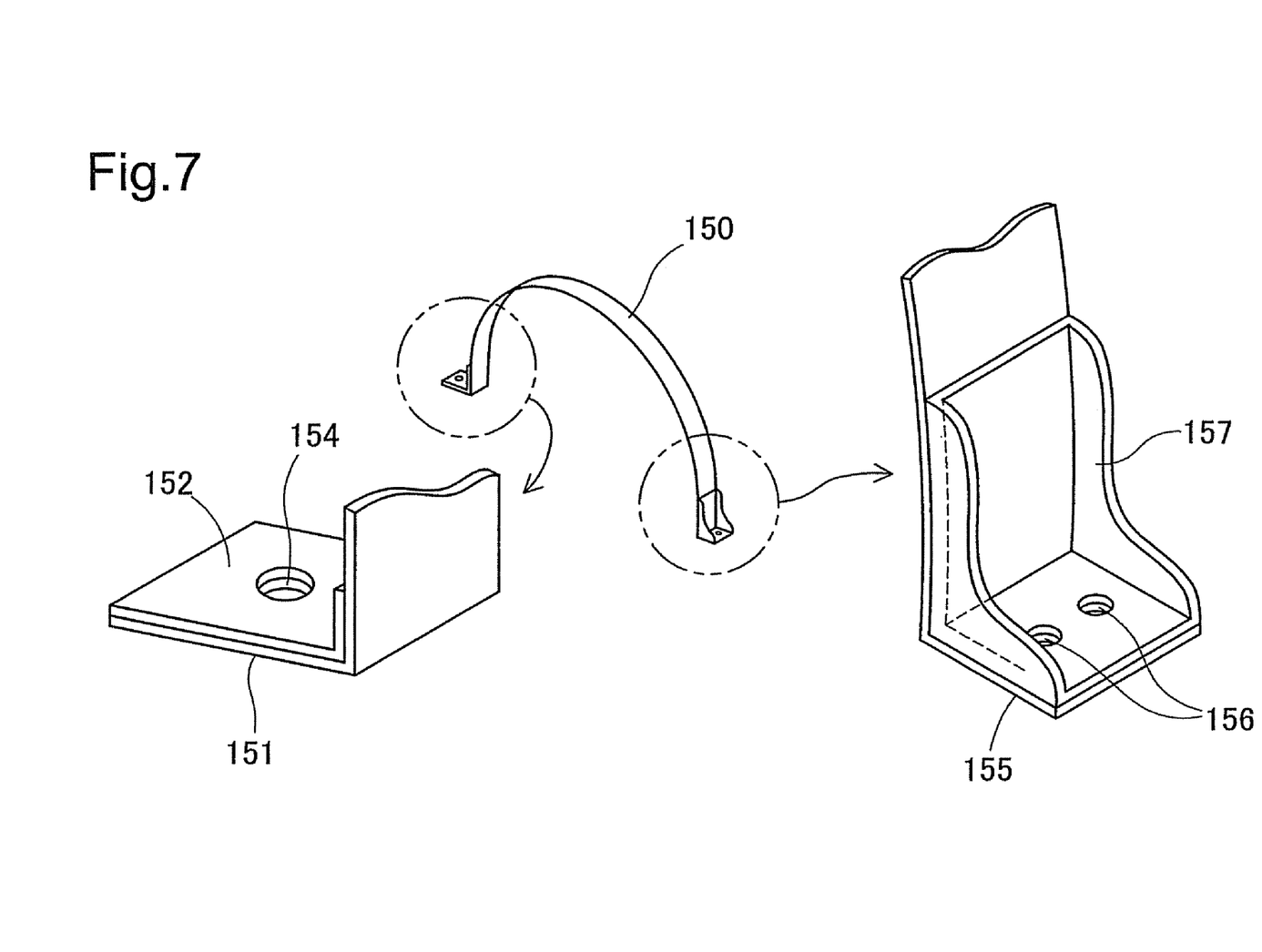
FIG. 7 is an explanatory view of a restraining strap 150 including enlarged views of both ends of the restraining strap 150.

The tank mounting assembly 100 has winding straps 140 directly wound on and attached to the high-pressure tank T3 and semicircular restraining straps 150, in addition to the restraint belts for fixation of the tank discussed above. The winding strap 140 is shown separately from the high-pressure tank T3 in FIG. 4, but in the actual state, is attached in advance to the high-pressure tank T3 in the process of fixation of the high-pressure tank T3 to the corresponding frames. FIG. 6 is an explanatory view of the winding strap 140 including a sectional view and an enlarged view of parts of the winding strap 140. FIG. 7 is an explanatory view of the restraining strap 150 including enlarged views of both ends of the restraining strap 150.

Referring to FIG. 6, the winding strap 140 has a double-layered structure and includes a surface belt member 141 made of a metal material and an inner belt-like cushion layer 142. Both ends of the surface belt member 141 are bent to form bent ends 141a and 141b. The surface belt member 141 is formed in a circular shape having a diameter corresponding to the outer diameter of the high-pressure tank T3. The surface belt member 141 is deformable to make the opposed bent ends 141a and 141b apart from each other and is returnable to the original circular shape. A fixing bracket 145 is spot welded to the bent end 141b. The fixing bracket 145 has a fixation function to fasten the restraining strap 150, as well as a reinforcing function to reinforce the bent end 141b. Bolts 143 (see FIG. 4) are inserted from the side of the fixing bracket 145 into bolt holes 146 and 167. The restraining strap 150 is accordingly fastened at a specific position determined by the attachment position of the fixing bracket 145.

The restraining strap 150 is a metal strap made of, for example, a spring steel plate. Referring to FIG. 7, one end of the restraining strap 150 is bent to form a bent end 151, and an L-shaped bracket 152 is spot welded to the bent end 151 for the purpose of reinforcement. The other end of the restraining strap 150 is also bent to form a bent end 155, and a fixing bracket 157 with bolt holes 156 is spot welded to the bent end 155. The fixing bracket 157 has a reinforcing function to reinforce the bent end 155, and also functions, in combination with the fixing bracket 145 of the winding strap 140, to fasten the restraining strap 150. Referring back to FIG. 4, the fixation procedure brings the fixing bracket 156 into contact with the fixing bracket 145 of the winding strap 140, and fastens the restraining strap 150 to the winding strap 140 at the specific position determined by the attachment position of the fixing bracket 145. As shown in FIG. 4, the restraining strap 150 fastened to the winding strap 140 has the free bent end 151 placed on a fixing seat 113a of the frame 113 and is fastened to the frame 113 by means of a bolt 153.

The high-pressure tanks T1 and T2 on the front side of the rear wheels RT are also mounted and unitized by a tank framing structure, which is basically similar to the tank mounting assembly 100 discussed above. There is, however, a low potential that any foreign substance comes close to the high-pressure tanks T1 and T2 located on the front side of the rear wheels RT. The protector 160 can thus be omitted from the tank framing structure for the high-pressure tanks T1 and T2. There is also a low potential that any external force as shown in FIG. 1 affects the high-pressure tanks T1 and T2 horizontally arranged side by side and located on the front side of the rear wheels RT. The winding strap 140 and the restraining strap 150 can thus be omitted from the tank framing structure for the high-pressure tanks T1 and T2.

The high-pressure tank T3 and the high-pressure tank T4 are transversely mounted and fastened to the tank framing structure by means of the tank upper end restraint belts 120 and the tank lower end restraint belts 130 discussed above. In this tank mounting condition, the tank mounting assembly 100 is fixed in a mounting area below the platform F on the rear side of the axle of the rear wheels RT as shown in FIG. 2. The fixing seats 115 provided on the respective both ends of the frames 111 through 113 are fastened to a vehicle framework (not shown). The high-pressure tank T3 and the high-pressure tank T4 are then transversely mounted to be obliquely arranged side by side with the high-pressure tank T4 at the higher position and to be extended along the vehicle width direction. The high-pressure tank T4 is located closer to a bumper frame BF that fastens an impact buffer RA in a rear bumper RB, that is, on the very rear side of the vehicle body. The protector 160 is then placed together with the frame 111 furthest away from the axle of the rear wheels RT on the rear side of the high-pressure tank T4 (on the outer circumferential side of the vehicle body). After fixation of the tank mounting unit 100, a resin tank cover TK is attached below the high-pressure tanks. The tank cover TK protects the high-pressure tanks from pebble or any other foreign substance thrown up by the rear wheels RT.

Figure 8:
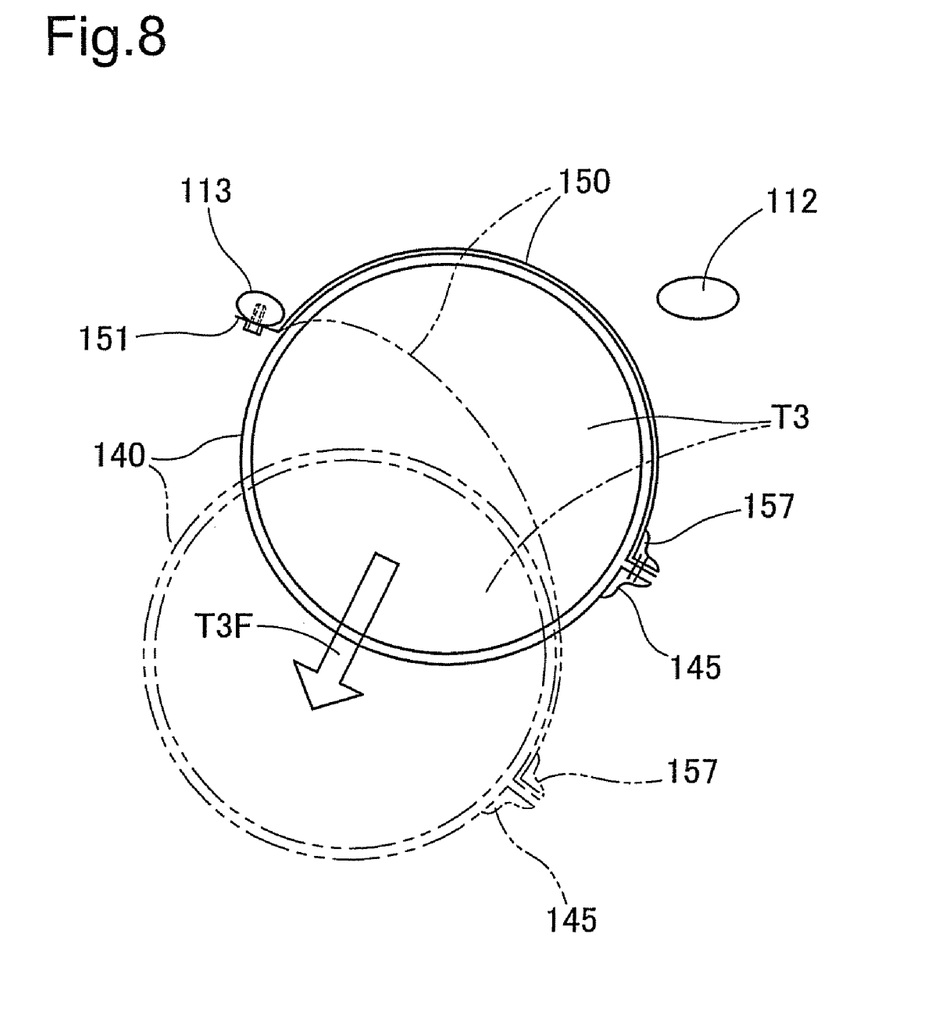
FIG. 8 is an explanatory view showing a state of attaching a high-pressure tank T3 to a frame 113 by means of the winding strap 140 and the restraining strap 150.

In the vehicle 10 of the embodiment having the configuration discussed above, the high-pressure tank T3 is transversely mounted via the tank mounting assembly 100 on the rear side of the axle of the rear wheels RT and is attached to the frame 113 and to the vehicle body by means of the restraining strap 150 fastened to the frame 113 and the winding strap 140 wound on the high-pressure tank T3. FIG. 8 is an explanatory view showing a state of attaching the high-pressure tank T3 to the frame 113 by means of the winding strap 140 and the restraining strap 150. The tank fixation structure is omitted from the illustration of FIG. 8. As discussed previously with reference to FIGS. 2 through 4, the high-pressure tank T3 is transversely mounted and fastened between the frame 112 and the frame 113 by means of the tank upper end restraint belts 120 and the tank lower end restraint belts 130 spanned above and below the high-pressure tank T3 to join the frames 112 and 113 with each other. The rear wheel RT is also omitted from the illustration of FIG. 8. As clearly understood from the illustration of the high-pressure tank T3 in FIG. 2, the horizontal direction of the high-pressure tank T3 in FIG. 8 represents the vehicle longitudinal direction, and the right side of the high-pressure tank T3 represents the rear side of the vehicle body.

As shown in FIG. 8, the winding strap 140 is wound on the high-pressure tank T3, such that the fixing bracket 145 is located on the right side of the tank circumferential wall. The restraining strap 150 is laid on the winding strap 140 to be placed directly on the upper circumferential wall of the high-pressure tank T3 and is extended from the fixing bracket 145 of the winding strap 140 to the frame 113 to be fastened to the frame 113. The procedure for establishing such a positional relationship fastens the restraining strap 150 to the frame 113 in the state of temporarily joining the winding strap 140 with the restraining strap 150. The procedure then applies a tension onto the restraining strap 150 across the winding strap 140 to place the restraining strap 150 and the winding strap 140 directly on the tank circumferential wall, and finally fixes the winding strap 140 and the restraining strap 150 to each other.

Even under the application of the external force shown in FIG. 1 a direction of moving the high-pressure tank T3 transversely mounted between the frame 112 and the frame 113 downward as shown by an open arrow T3F in FIG. 8, the structure of the embodiment enables the potential downward movement of the high-pressure tank T3 to be restricted by the length of the restraining strap 150. This arrangement desirably relieves the potential loading on the gas piping P arranged to pass through the respective tanks (see FIG. 1) due to the potential downward movement of the transversely mounted high-pressure tank T3 by an amount corresponding to the restriction of the tank movement by means of the restraining strap 150.

In the structure of this embodiment, the restraining strap 150 is laid on the winding strap 140 to be placed directly on the upper circumferential wall of the high-pressure tank T3 and accordingly fastens the high-pressure tank T3 to the frame 113 (eventually to the vehicle body). Under the application of an external force in the direction of moving the transversely mounted high-pressure tank T3 downward as shown by the open arrow T3F, the high-pressure tank T3 moves downward away from the restraining strap 150, which is laid on the winding strap 140 to be placed directly on the upper tank circumferential wall. Since the restraining strap 150 is placed directly on the upper circumferential wall of the high-pressure tank T3, the applied force in the direction of moving the high-pressure tank T3 downward away from the restraining strap 150 simply moves the high-pressure tank T3 downward but does not include a rotational force of turning the high-pressure tank T3. Namely the high-pressure tank T3 does not rotate about its own tank shaft and does not apply a tank rotation-induced loading onto the gas piping P.

The restraining strap 150 laid on the winding strap 140 is placed directly on the upper circumferential wall of the high-pressure tank T3 by the simple procedure as discussed above. The procedure temporarily joins the restraining strap 150 with the winding strap 140 wound on the high-pressure tank T3, subsequently turns the winding strap 140, and finally fixes the winding strap 140 and the restraining strap 150 to each other.

In the structure of the embodiment, the high-pressure tanks T3 and T4 are transversely mounted and fastened to the frames 111 through 113 of the tank mounting assembly 100 in advance. The winding strap 140 and the restraining strap 150 are also set in advance in the tank mounting assembly 100 to restrict the downward movement of the high-pressure tanks. The tank mounting assembly 100 is then fixed in the tank mounting area on the rear side of the axle of the rear wheels RT. This procedure readily enables the high-pressure tanks T3 and T4 to be transversely mounted on the vehicle 10.

In the structure of the embodiment, the winding strap 140 may be attached later to the transversely mounted high-pressure tank. The procedure of such later attachment may expand the interval between the bent ends 141a and 141b to set the winding strap 140 wound on the high-pressure tank and subsequently fasten the restraining strap 150 to the winding strap 140. The later attachment of the winding strap 140 and the restraining strap 150 to an existing vehicle equipped with high-pressure tanks effectively restricts the downward movement of the high-pressure tanks. In the existing vehicle with a tank framing structure similar to the tank mounting assembly 100 to mount the high-pressure tanks, the restraining strap 150 may be fastened to the tank framing structure. In the existing vehicle without such a tank framing structure, the restraining strap 150 may be fastened at any suitable position of the vehicle body, for example, the vehicle framework of the platform F.

The embodiment and its applications discussed above are to be considered in all aspects as illustrative and not restrictive. There may be many modifications, changes, and alterations without departing from the scope or spirit of the main characteristics of the present invention. In the embodiment discussed above, the high-pressure tanks T1 through T4 are hydrogen gas tanks designed to store the hydrogen gas to be supplied to the fuel cells mounted on the vehicle 10. The principle of the invention is similarly applicable to natural gas tanks mounted on a vehicle equipped with an engine consuming natural gas as the fuel.

In the embodiment discussed above, the tank mounting assembly 100 is fixed on the rear side of the vehicle body to transversely mount the high-pressure tanks T3 and T4 that are extended along the vehicle width direction. The principle of the invention is similarly applicable to a tank mounting assembly fixed on the front side of the vehicle body to transversely mount high-pressure tanks that are extended along the vehicle width direction or to a tank mounting assembly fixed to transversely mount high-pressure tanks that are extended in the vehicle longitudinal direction. In such modified structures, the winding strap 140 may be wound on a tank with a potential for downward movement, and the restraining strap 150 fixed to the winding strap 140 may be fastened to a vehicle framework or to a tank framing structure.

The invention claimed is:

1. A vehicle equipped with a high-pressure tank transversely mounted under a vehicle floor to have a tank longitudinal direction extended along the vehicle floor,
    the vehicle comprising:
    a tank mounting frame located mostly above the high-pressure tank;
    a winding strap wound completely around the circumferential wall of the transversely mounted high-pressure tank, and
    a restraining strap that extends along an upper end portion of the circumferential wall of the high-pressure tank, and having one end fixed to the winding strap and the other end fastened to the frame that is located mostly above the high-pressure tank.

2. The vehicle in accordance with claim 1, wherein the restraining strap is fastened to the frame at a preset tank face position that is opposite to the position of the fixation of the restraining strap to the winding strap on the circumferential wall of the high-pressure tank.

3. The vehicle in accordance with claim 2, comprising:
    a first high-pressure tank and a second high-pressure tank arranged obliquely side by side in a vehicle longitudinal direction to have tank longitudinal directions of the respective high-pressure tanks extended along a vehicle width direction, wherein the first high-pressure tank and the second high-pressure tank are transversely mounted under the vehicle floor, such that the second high-pressure tank is located behind the first high-pressure tank in the body and at a higher position than a position of the first high-pressure tank in a vehicle vertical direction, and
    the winding strap with the restraining strap fixed at the position of the fixation is wound on the first high-pressure tank.

4. The vehicle in accordance with claim 3, wherein the first high-pressure tank is located on a rear side of an axle of rear-wheels in the vehicle.

5. The vehicle in accordance with claim 1, comprising:
    a first high-pressure tank and a second high-pressure tank arranged obliquely side by side in a vehicle longitudinal direction to have tank longitudinal directions of the respective high-pressure tanks extended along a vehicle width direction, wherein the first high-pressure tank and the second high-pressure tank are transversely mounted under the vehicle floor, such that the second high-pressure tank is located behind the first high-pressure tank in the body and at a higher position than a position of the first high-pressure tank in a vehicle vertical direction, and
    the winding strap with the restraining strap fixed at the position of the fixation is wound on the first high-pressure tank.

6. The vehicle in accordance with claim 5, wherein the first high-pressure tank is located on a rear side of an axle of rear-wheels in the vehicle.

7. A tank assembly constructed to mount a high-pressure tank to a vehicle, the tank assembly comprising:
    a pair of frames located on both sides of the high-pressure tank to be extended in a tank longitudinal direction and arranged along a vehicle width direction under a vehicle floor to be fastened to a body of the vehicle;
    a tank restraint belt spanned between the pair of frames located on both the sides of the high-pressure tank to transversely arrange the high-pressure tank and fix the high-pressure tank between the pair of frames;
    a winding strap wound on the high-pressure tank transversely arranged and fixed between the pair of frames; and
    a restraining strap fixed to the winding strap at a preset position on one frame of the pair of frames, the restraining strap being protruded from the preset position of the fixation and extended along an upper end portion of a circumferential wall of the high-pressure tank to be fastened to the other frame of the pair of frames.

8. A vehicle equipped with a high-pressure tank transversely mounted under a vehicle floor to have a tank longitudinal direction extended along the vehicle floor,
    the vehicle comprising:
    a winding strap wound on the transversely mounted high-pressure tank, and
    a restraining strap laid on top of and fixed to the winding strap so as to extend over an outer surface of the winding strap from a position of fixation,
    wherein the restraining strap is protruded from the position of fixation to the winding strap and is extended along an upper end portion of a circumferential wall of the high-pressure tank to be fastened to a body of the vehicle.

* * * * *